(No Model.)
J. H. BUTTORFF.
HEAD GATE.
No. 602,973. Patented Apr. 26, 1898.
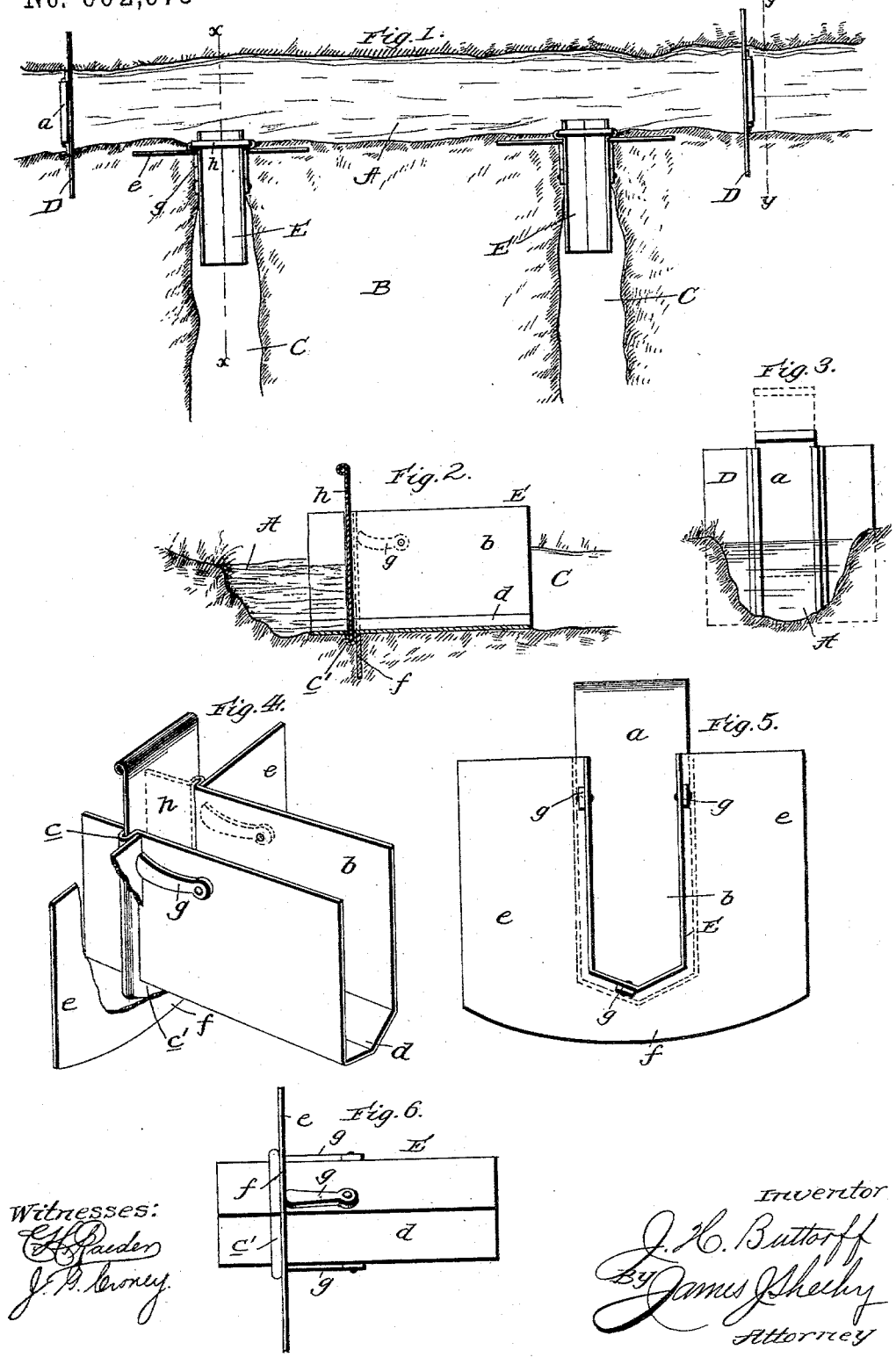

UNITED STATES PATENT OFFICE.

JOHN H. BUTTORFF, OF FORT COLLINS, COLORADO.

HEAD-GATE.

SPECIFICATION forming part of Letters Patent No. 602,973, dated April 26, 1898.

Application filed June 26, 1897. Serial No. 642,519. (No model.)

*To all whom it may concern:*

Be it known that I, JOHN H. BUTTORFF, a citizen of the United States, residing at Fort Collins, in the county of Larimer and State of Colorado, have invented certain new and useful Improvements in Head-Gates; and I do declare the following to be a full, clear, and exact description of the invention, such as will enable others skilled in the art to which it appertains to make and use the same.

My invention relates to irrigation, and more particularly to means for controlling the passage of water from ditches or laterals into channels between beds of earth; and it has for its general object to provide a head for such purpose which is adapted to be quickly and easily secured in position and one which embodies a trough, a gate for controlling and regulating the flow of water through the trough, and wings designed to be forced into the earth, so as to enable them to prevent the water working its way under or past the sides of the trough.

The invention also contemplates constructing the heads in such a manner that they may be knocked down in part, so as to take but a minimum amount of space in shipping.

The invention further contemplates making the heads light and convenient to carry, so that they may be easily moved from point to point when it is desired to change the course of the water, as is frequently done in irrigation systems.

Other objects and advantages of the invention will be fully understood from the following description and claims when taken in conjunction with the annexed drawings, in which—

Figure 1 is a plan view illustrating a ditch or lateral beds of earth at the side of the same and channels between the beds, together with partitions for dividing the lateral, and my improved heads for controlling communication between the ditch or lateral and the channels. Fig. 2 is a section taken in the plane indicated by the line *x x* of Fig. 1. Fig. 3 is a section taken in the plane indicated by the line *y y* of Fig. 1. Fig. 4 is an enlarged perspective view of one of the heads with a portion of one of the wings broken away. Fig. 5 is a rear elevation of the head, and Fig. 6 is an inverted plan view of the same.

In the said drawings similar letters designate corresponding parts in all of the several views, referring to which—

A indicates a ditch or lateral.

B indicates beds of earth.

C indicates channels leading from the ditch or lateral between the beds of earth.

D indicates partitions, preferably of galvanized iron, which divide the ditch or lateral into sections and have gates $a$, whereby communication may be effected between the sections without the removal of the partitions, and E indicates my improved heads, which have for their purpose to control and regulate the passage of water from the ditch or lateral to the channels C. These heads are preferably formed entirely of galvanized sheet-iron, which is well adapted for the purpose, because it is not liable to corrode when exposed to the weather or to the action of water and also because it is not unduly heavy, and therefore permits of them being readily moved from one point to another when the course of the water is to be changed. One of the heads E is shown in Fig. 4, and it comprises the trough $b$, which has the vertical guideways or grooves $c$ in its side walls and the gate-seat $c'$ in its bottom wall and also has its bottom $d$ inclined downwardly and inwardly toward its longitudinal center, so as to enable it to take slightly into the earth, so as to assist in holding the head against lateral deflection, the wings $e$ extending laterally from the side walls of the trough, and the bottom wing $f$, which is formed integral with the wings $e$ and extends downwardly from the bottom of the trough, and the pivoted cam-pieces $g$, which are connected to the side walls and bottom of the trough $b$ and are designed to press the piece of metal forming the wings $e f$ against the flanges formed by the provision of the grooves $c$ and the vertically-movable gate $h$, which is designed to be raised and lowered in the grooves $c$ and in its lowermost position to rest in the seat $c'$, so as to effectually prevent the passage of water between its lower end and the bottom of the trough $b$ when desired.

The piece of sheet-iron forming the wings $e f$ is detachably connected with the trough $b$ by the cam-pieces $g$, as described, and it may be readily disconnected from the trough by swinging said cam-pieces upwardly and drawing it and the trough apart. The said piece of metal forming the wings $e\,f$ is designed to be disconnected from the trough $b$, as described, so as to permit of the heads being shipped compactly and so that they will take up but a minimum amount of space when stored away.

In using my improved heads they are arranged at the junction of the ditch or lateral A and the channels C, as shown in Fig. 1, and the lower portion of the piece of metal forming the wings $e\,f$ is pressed into the earth, as shown in Fig. 2, so as to enable the wing $f$ to prevent the water from working its way under the trough $b$ and the wings $e$ to prevent the water from working its way past the sides of the trough, or, in other words, to prevent the water from taking any course except that through the trough $b$. This passage of the water is controlled effectually by the gate $h$, and it will therefore be seen that communication between the ditch and the channels C may be entirely cut off or water may be permitted to pass in greater or less volume from the ditch into the channels C, as desired, by lifting the gate $b$ to a greater or less height.

My improved head may be secured in position by simply pressing upon it with the foot, and it may be as readily removed when desired and conveniently carried to another point and secured in position.

I prefer to detachably connect the wing-pieces—that is, the pieces of metal forming the wings $e\,f$—to the trough $b$ in a detachable manner for the reason stated. I do not, however, wish to be understood as confining myself to such construction, as, when desired, said wing-piece may be fixedly and permanently connected to the trough by rivets or other suitable means. I also do not desire to be understood as limiting myself to the details of the present embodiment of my invention, as such changes or modifications may be made in practice as fairly fall within the scope of my invention.

Furthermore, I claim the advantage of this invention applied to nailing onto wooden boxes or flumeways to prevent underflow and side flow.

Having described my invention, what I claim, and desire to secure by Letters Patent, is—

1. The head-gate described comprising the trough having the grooves $c$, in its side walls and the seat $c'$, in its bottom wall, laterally and downwardly extending wings connected to the trough, and the vertically-movable, slide-gate arranged in the grooves $c$, and seat $c'$, substantially as specified.

2. The head described comprising the trough having its side and bottom walls bent to form grooves $c$, and a seat $c'$, and also having its bottom wall inclined downwardly to its longitudinal center, laterally and downwardly extending wings connected to the trough, and the slide-gate arranged in the grooves $c$, and adapted to control the passage of water through the trough, substantially as specified.

3. The head described comprising the trough having its side and bottom walls bent to form internal grooves $c$, and an internal seat $c'$, and external flanges, the lateral and downwardly extending wings formed in one piece, and the cam-pieces pivotally connected to the side and bottom walls of the trough and adapted to press and hold the wings against the external flanges of the trough, substantially as specified.

In testimony whereof I affix my signature in presence of two witnesses.

JOHN H. BUTTORFF.

Witnesses:
J. E. RAMER,
H. S. YOUTSEY.